June 27, 1972  H. LLOP ET AL  3,672,777

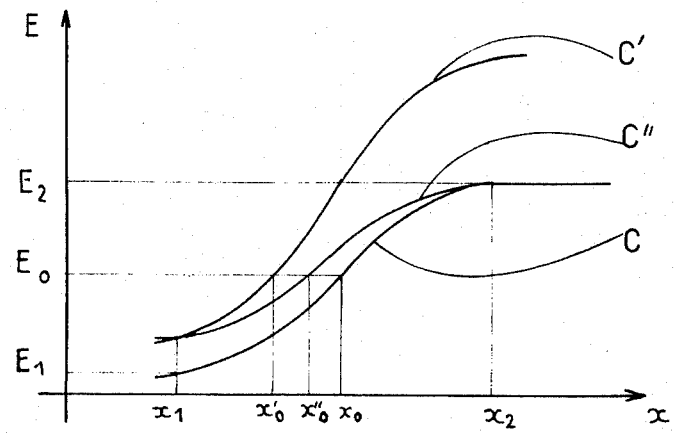
FIG:1
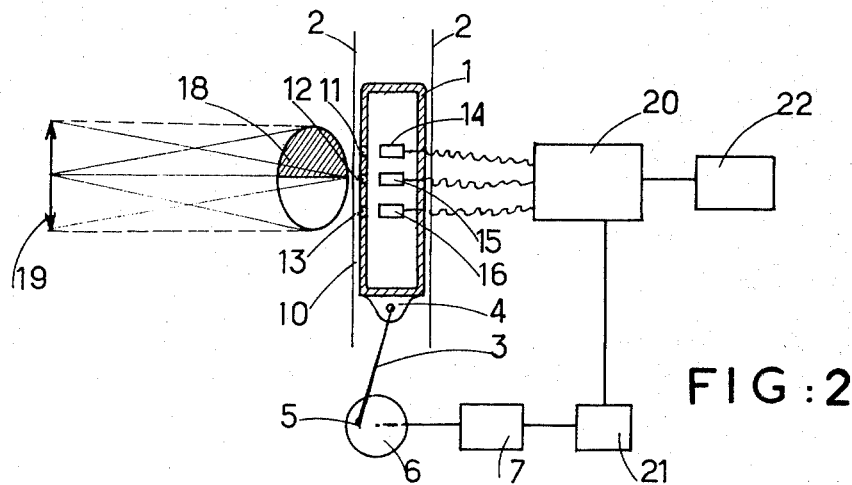
FIG:2
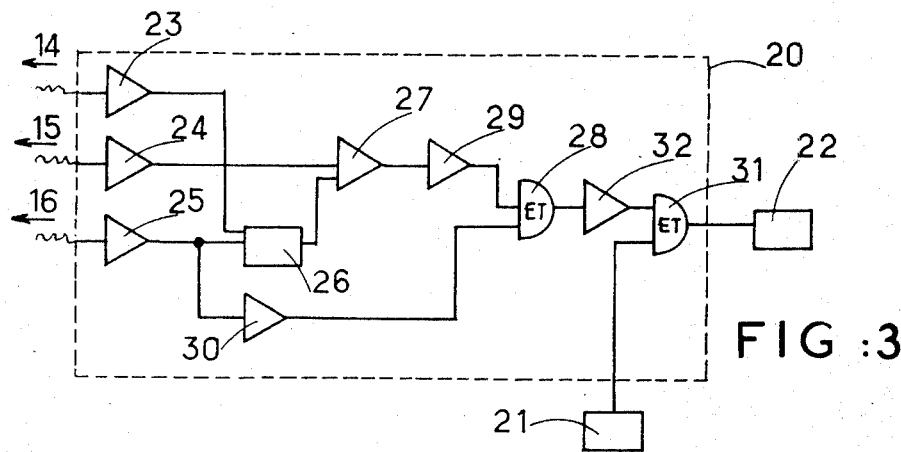
FIG:3

APPARATUS FOR SENSING A CHANGE IN LIGHT INTENSITY

Filed Sept. 21, 1970  2 Sheets-Sheet 2

United States Patent Office 3,672,777
Patented June 27, 1972

3,672,777
APPARATUS FOR SENSING A CHANGE IN LIGHT INTENSITY
Helenio Llop, Creteil, France, assignor to Societe D'Optique Precision, Electronique et Mecanique-Sopelem, Paris, France
Filed Sept. 21, 1970, Ser. No. 73,998
Claims priority, application France, Oct. 30, 1969, 6937413
Int. Cl. G01n 21/46; H01j 39/12
U.S. Cl. 356—135
5 Claims

ABSTRACT OF THE DISCLOSURE

A refractometer in which the position of the change in intensity of the refractometer beam at the critical angle is sensed by a photoelectric sensor comprising an opaque screen defining two or three slits behind each of which a photoelectric cell is positioned, the outputs of the cells being supplied to an electronic circuit which provides a signal at the mean position of the change in intensity.

---

The invention relates to apparatus for sensing a change in light intensity, more particularly but not exclusively for precisely sensing the position of an optical boundary for the purpose of automatically reading its position relative to a reference scale. By way of example, the invention may be applied to the sensing of the boundary in an optical refractometer.

In an optical refractometer, a beam of parallel light is thrown on to the plane surface separating a body having a known refractive index (for example glass) from the body whose refractive index is to be measured. The angle of incidence of the beam on the plane surface is varied until total internal reflection is obtained, the corresponding angle of incidence then giving the value for the refractive index sought. For a slight variation in the angle of incidence on either side of the critical angle, the reflected beam shows a large variation in intensity, and if an image of it is formed by means of a lens assembly, the image spot shows a variation in luminosity, and the position of this separating or boundary zone is characteristic of the refractive index to be measured.

The difficulty of precisely sensing the position of a refractometer boundary is well known. It is due to the gradual variation of the light intensity at the transition, which means that a very precise light intensity must be measured. Known devices for sensing the position of an optical boundary generally use a photoelectric cell which is displaced in relative motion in front of the image of the boundary, the response being produced when the voltage at the cell reaches a predetermined threshold. This method has the serious disadvantage of giving variable readings if the overall conditions of illumination change, for example due to a variation in the supply voltage, when the actual position of the boundary has not changed.

The invention overcomes these disadvantages by sensing the position of a change in light level by means of apparatus which is unaffected by general variations in the light intensity or by the rate of variation of the light level at the transition.

According to the present invention, there is provided apparatus for sensing the position of a change in light intensity, comprising a photoelectric sensor, means for receiving signals from the sensor, means for moving the sensor relative to the zone of variable light intensity and in the direction of variation of the light intensity, and means for sensing the position of the sensor relative to the said zone, wherein the sensor comprises an opaque screen defining at least two slits of equal width designed to extend perpendicular to the direction of variation of the light intensity, and at least two photoelectric cells of substantially identical characteristics, each cell being positioned behind one of the slits, and the means for receiving signals from the sensor consists of an electronic circuit for receiving the voltages supplied by the cells and connected to the means for sensing the position of the sensor relative to the said zone.

The invention will now be described in more detail with reference to a particular embodiment, given by way of example only, and illustrated in the accompanying drawings, in which:

FIG. 1 is a graph showing the usual forms of curves representing the variation in the light intensity in the transition zone forming an optical boundary;

FIG. 2 illustrates diagrammatically the use of apparatus according to the invention;

FIG. 3 is a diagram of the electronic circuit associated with the apparatus shown in FIG. 2, and FIGS. 4 and 5 show in a simplified manner how the apparatus may be mounted on the swinging arm of an optical refractometer, FIG. 4 being a plan view of the arm and FIG. 5 showing a section along a line V—V of FIG. 4.

Figure 4:
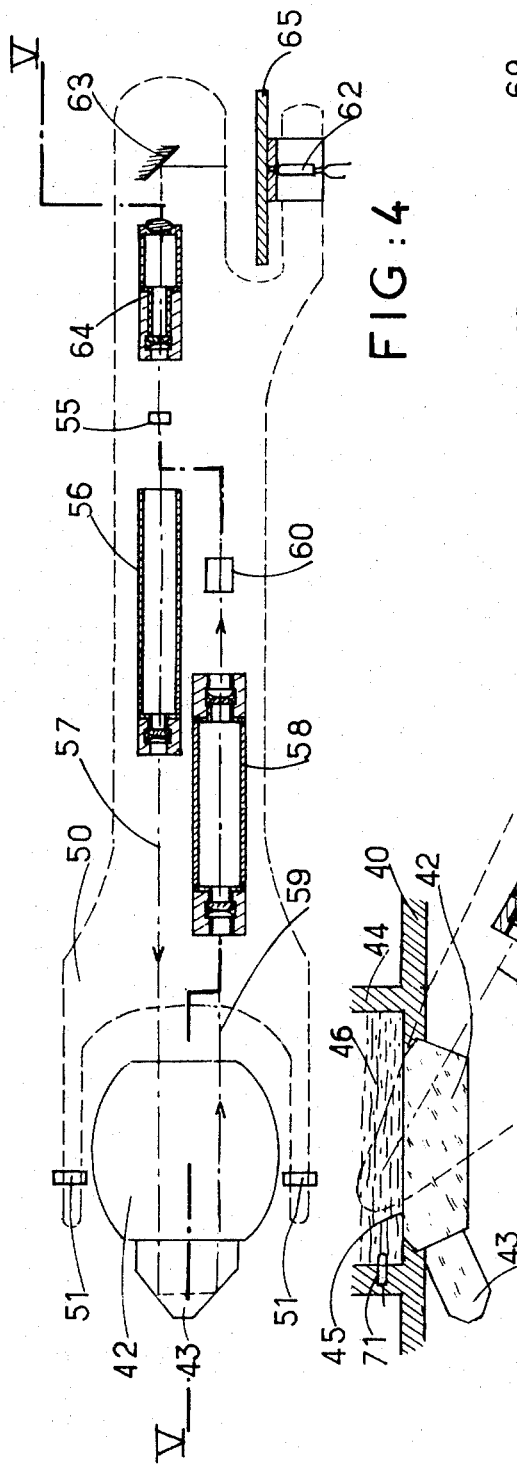

The disadvantage of a conventional sensor with a single photoelectric cell responding when the voltage at the terminals of the cell reaches a predetermined threshold will be better understood by referring to FIG. 1.

The curve C gives the value for the light intensity E of the image when one moves in the direction $x$ of the variation in illumination, and the boundary extends over the zone between $x_1$, where the illumination $E_1$ is lowest, and $x_2$ where the illumination $E_2$ is highest. If the value $E_0$, which is between $E_1$ and $E_2$, is defined as the transition threshold, the position of the boundary will be read at $x_0$. If, however, there should be a general, accidental variation in illumination, independent of the phenomenon observed, that is to say, without any normal influence on the position of the boundary, it will deform the curve C homothetically, shifting it to C', and the position for the boundary will be read at $x'_0$. Similarly, if an accidental variation in illumination only affects, for example, the lower light level, the transition curve will shift to C'' and the reading to $x''_0$.

In FIG. 2, the sensor is in the form of a housing 1 capable of sliding between guides 2 and reciprocated by a connecting rod 3 pivoted at 4 on the housing and at 5 on a crank plate 6 coupled to a motor 7.

One side of the housing 1 is formed as an opaque screen 10 containing three equidistant slits 11, 12 and 13 of equal width. Three identical photoelectric cells 14, 15 and 16 are provided inside the housing, one cell being opposite each slit.

The image 18 of the boundary whose position is to be sensed is formed by an optical system 19 on the screen 10 of the housing. The cells 14 to 16 are electrically connected to an assembly 20 of electronic circuits, which is connected in turn to a pulse generator 21 connected to the motor 7 and to a pulse counter 22.

FIG. 3 illustrates the electronic circuits in the assembly 20 in detail. Each cell 14, 15 and 16 is connected to a matching amplifier 23, 24 or 25 respectively. The signals S1 and S3 from the amplifiers 23, 25 for the end cells 14, 16 are fed into a conventional summator circuit 26 (for example, of the resistance type), which produces an output value equal to half the sum of the two input values, that is to say $$\frac{S1+S2}{2}$$

A differential amplifier 27 receives the signal S2 from the amplifier 22 for the centre cell 15, and also the output signal $$\frac{S1+S2}{2}$$

from the summator circuit 26. The differential amplifier 27 is set to change state when the equation $$S2 = \frac{S1+S3}{2}$$

is satisfied. A low-level AND gate 28 receives the output signal from the differential amplifier 27 and the output signal from the amplifier 25, via inverse amplifiers 29, 30 respectively. The pulses from the generator 21 are transmitted to the counter 22 through a low-level AND gate 31, which also receives the output signal from the gate 28 by way of an inverse amplifier 32.

At the beginning of each cycle, in which the sensor 1 is driven across the image 18 of the boundary, by means of the motor 7 and connecting rod assembly 3, the counter 22 is set at zero and the generator 21 begins to transmit pulses. These pulses pass through the gate 31, since the output from the inverse amplifier 32 is then at a low level, and the counter 22 records the pulses.

If, at the beginning of this cycle, the three cells are not illuminated, the signals from the three amplifiers 23, 24 and 25 are zero. The equation $$\frac{S1+S3}{2} = S2$$

will then be satisfied. The circuits 28, 30 prevent the information from being taken into account, the high level of the output from the inverse amplifier 30 blocking the gate 28. As the three cells in the sensor are displaced across the boundary, the output level for the ampliefirs 23, 24, 25 rises, and, when the equation $$\frac{S1+S3}{2} = S2$$

is again satisfied at the input to the comparator amplifier 27, the zero output from the latter becomes positive. The output from the inverse amplifier 29 drops, and the signal passes through the open gate 28 and, after inversion at 32, closes the gate 31, stopping the measuring pulses from 21. The contents of the counter 22 then give the position of the boundary.

Returning to FIG. 1, it will be readily understood that the value for $x$ at which the equation $$S2 = \frac{S1+S3}{2}$$

is obtained is substantially constant, even if the curve C for the variation in light level in the boundary zone is shifted to C' or C''.

Figure 5:
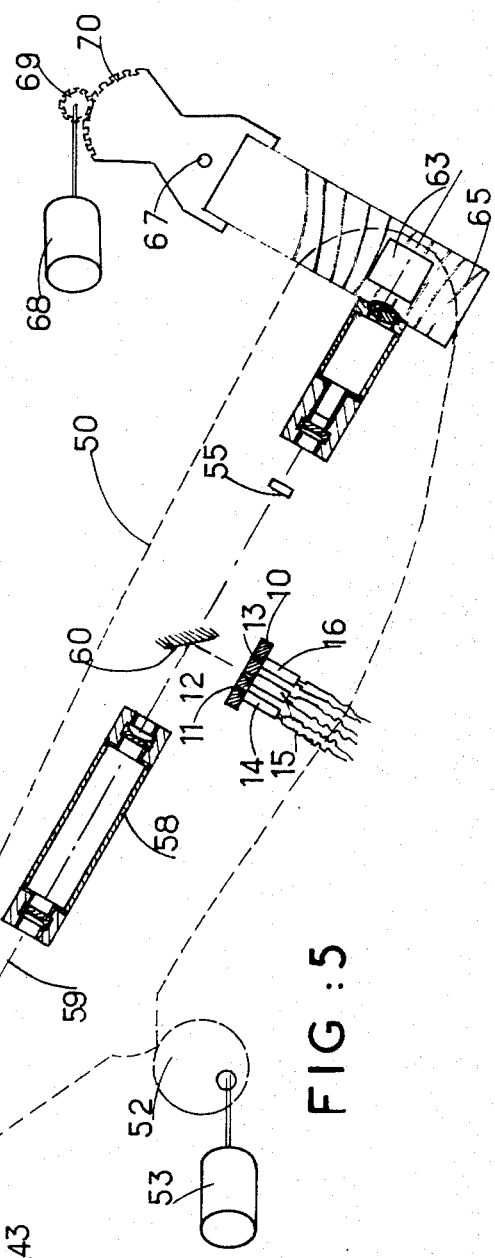

FIGS. 4 and 5 represent the operating elements of an embodiment of the invention as applied to an optical refractometer having a swinging arm.

The refractometer has a housing 40, in one face of which an optical block 42 is embedded. One portion 43 of this block is in the form of a prism. The housing 40 forms a dish 44, the bottom of which is formed by a plane surface 45 of the block 42. The liquid 46 whose refractive index is to be measured is poured into the dish 44, and the surface 45 forms the refraction surface between the two media 42, 46.

An arm 50 hinges on two aligned bearings 51, whose common horizontal axis is parallel to the surface 45. The arm 50 can be swung in a vertical plane by means of a cam 52 operated by a motor 53.

The arm 50 carries a lamp 55 and an optical condenser 56, which forms an incident beam 57 of parallel light in a direction passing substantially through the pivot axis of the arm and perpendicular to this axis. A lens assembly 58, parallel to the condenser 56, receives the reflected beam 59 which the incident beam 57 becomes after a first total internal reflection at the surface 45, two reflections inside the prism 43, and a second total internal reflection at the surface 45. The arm also supports the sensor, formed of three photoelectric cells 14 to 16 situated behind an opaque screen 10 containing three equidistant slits 11 to 13. Because of the interposition of a plane reversing mirror 60, the slitted screen 10 is situated in the focal plane of the lens assembly 58 in such a way that the slits are parallel to the surface 45, and the center slit 12 is situated on the optical axis of the lens assembly 58 and mirror 60.

When the arm 50 tilts, the incident and reflected beams 57 and 59 remain parallel to one another, but when their angle to the surface 45 is close to the critical angle the reflected beam 59 rapidly changes in intensity, and the image formed by the lens assembly 58 includes a light intensity transition zone. When the arm 50 tilts, the image of the boundary therefore shifts on the screen 10.

The three cells 14, 15 and 16 are connected to an assembly of electronic circuits similar to that described above with reference to FIG. 3. The state of the differential amplifier 27 when the signal from the centre cell is equal to half the sum of the signals from the end cells represents a positioning of the theoretical boundary over the centre of the sensor, and the corresponding position of the arm represents the critical angle of incidence of the beam 57 and therefore the value of the refractive index sought.

The pulse generator, which is equivalent to the generator 21 in the embodiment shown in FIG. 2, is in the form of a photoelectric cell 62 receiving, by way of a plane reflecting mirror 63, a light beam derived from the lamp 55 by a condenser 64. The mirror 63 and cell 62 are mounted on two separate branches of the arm 50, and between these two branches there is a grating 65 which is attached to the base of the apparatus and which therefore remains stationary when the arm 50 tilts. The grating 65 is formed by a transparent plate bearing regularly spaced opaque lines. When the arm 50 tilts, the light beam is interrupted whenever it passes across an opaque line, and the signal from the cell 62 takes the form of a train of pulses which, as in FIG. 3, are recorded in a counter 22 until the AND gate 31 is closed by the signal from the differential amplifier 27. In every cycle, therefore, the counter 22 displays the position of the arm 50 which corresponds to the critical angle of incidence.

A refractometer of this kind is often used to determine the titration standard of a solution or of a mixture of a substance which causes the refractive index of the base liquid to vary. It is used, for example, to determine the sugar content of a grape must and hence the probable wine alcohol content which fermentation of this must will give. In this case, however, the refractive index is usually a function of the temperature, so that it is necessary to make a correction taking the temperature of the solution or mixture studied into account.

In the apparatus described in this specification, this correction is obtained by making the position of the grating 65 adjustable. The regularly spaced opaque lines in this grating will then not be equispaced throughout, but will be in the form of a diagram calibrated experimentally. The grating 65 is pivoted at 67 and can be displaced by a motor 68 acting on an assembly comprising a pinion 69 and a toothed sector 70, the motor 68 being operated in turn by a temperature sensor 71 registering the temperature of the liquid 46 studied.

Obviously, the invention is not restricted to the single embodiment described by way of example, but also covers others embodiments which differ only in detail and be within the scope of the appendant claims.

For example, a different electronic arrangement may be used, using logic assemblies of some other pattern but fulfilling the same functions as those described.

Similarly, it is not essential to have three cells in order to detect an optical boundary. It would be possible to use only two cells, giving signals S1 and S2, and for the position of the boundary to be indicated when the equation $S1 = S2/2$ is satisfied.

Alternatively, more than three cells might be used and the following equation might be sought:

$$\frac{S1.S2.S3}{K} = \frac{Sp.Sp+1.Sp2+2}{K'}$$

S1, S2, etc. $Sp$, $Sp+1$ being the signals supplied by the various cells, and K and K' being constants.

Apparatus with more than three cells may be used when the variable light intensity transition zone is very broad.

I claim:

1. An optical refractometer comprising an optical block, a refraction surface constituted by a face of the block, a prism constituted by an element of the block, an arm pivotable about an axis parallel to the refraction surface, a light source and a condenser for producing a beam of parallel light directed at a variable angle towards the refraction surface, a lens assembly for forming an image of the beam after it has undergone two total internal reflections at the refraction surface and two reflections in the prism, the light source, condenser and lens assembly being mounted on the arm and arranged with their optical axes parallel and perpendicular to the pivot axis of the arm, a photoelectric sensor mounted on the arm including an opaque screen having three equally spaced apart slits, three photoelectric cells, each of which is placed behind one of the slits, said slits being parallel to the refraction surface, an electronic circuit comprising a summator circuit for determining half the sum of the voltages supplied by the two outer cells, a comparator for comparing the output of the summator circuit with the voltage supplied by the centre cell and for generating a signal, positioning sensing means to sense the position of the arm responsive to said signal and means for moving the sensor and causing reciprocal movement of the arm about its axis.

2. A refractometer as claimed in claim 1, the centre slit in said screen extending in the focal plane of the lens assembly and lying on the optical axis of the lens assembly.

3. A refractometer as claimed in claim 1, said signal for the position sensing means being generated when the output of the summator circuit is equal to the voltage supplied by the centre cell.

4. A refractometer as claimed in claim 3, wherein the arm position sensing means includes a pulse generator emitting at every cycle a number of pulses corresponding to the displacement of the arm, a pulse counter, an AND gate closed by the output signal from said comparator, said pulses from said generator being transmitted through said AND gate to said counter.

5. A refractometer as claimed in claim 1, said electronic circuit including a divider circuit halving the voltage supplied by one of the said cells, a comparator comparing said half voltage with the voltage supplied by the other cell and transmitting a signal to said position sensing means when said half voltage is equal to the voltage supplied to the other cell.

References Cited

UNITED STATES PATENTS

| | | | |
|---|---|---|---|
| 3,551,681 | 12/1970 | Astheimer | 250—202 |
| 2,624,014 | 12/1952 | Barstow | 356—128 |
| 3,418,478 | 12/1968 | Falbel | 250—202 |
| 3,135,904 | 6/1964 | Purkhiser | 250—202 |

RONALD L. WIBERT, Primary Examiner

C. CLARK, Assistant Examiner

U.S. Cl. X.R.

250—202